J. J. WALTERS.
COOLER FOR LIQUIDS.
APPLICATION FILED MAR. 27, 1916.
1,297,760. Patented Mar. 18, 1919.
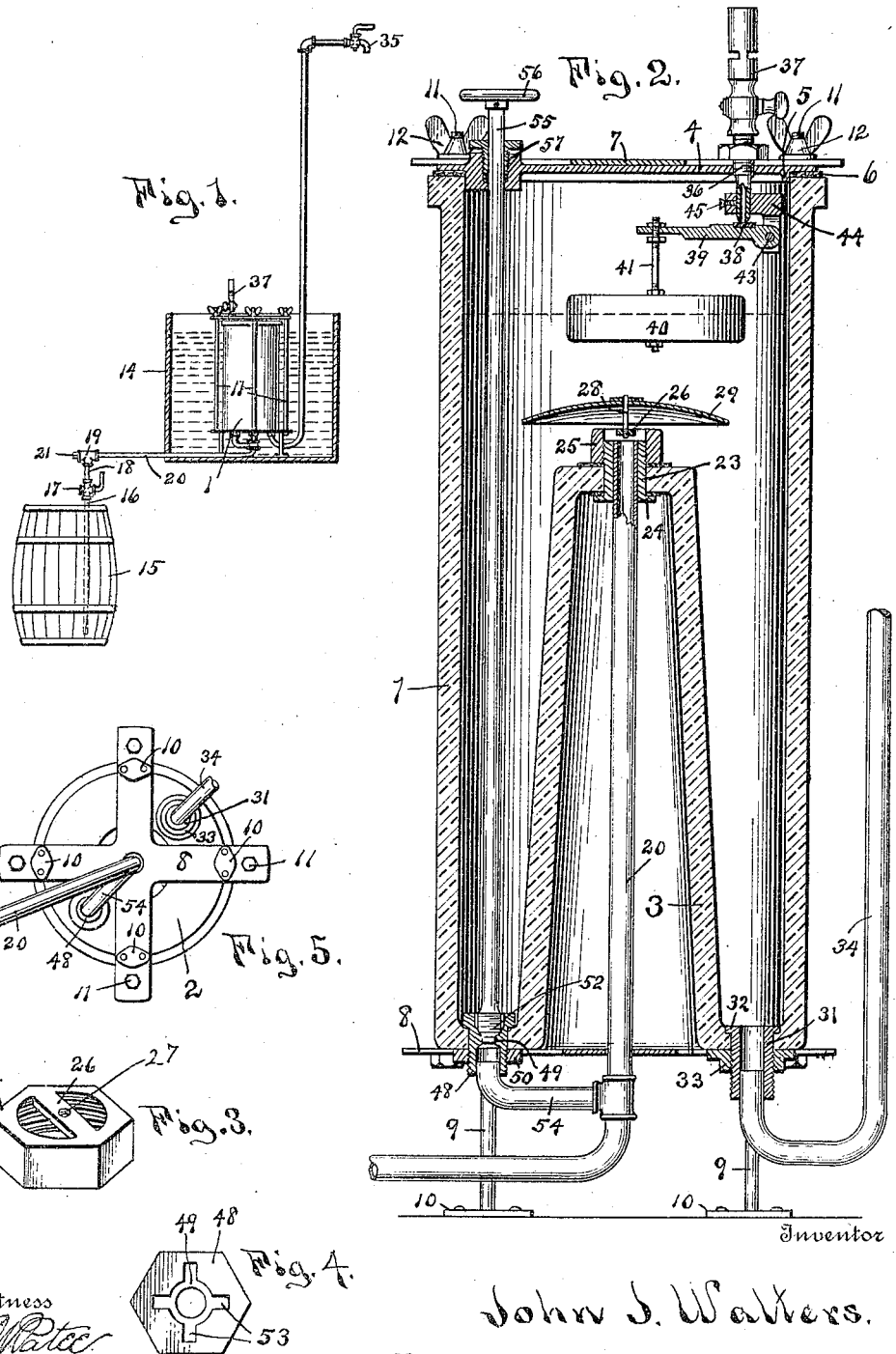
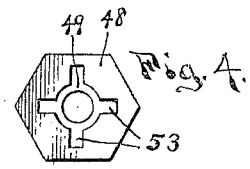
Witness
L. Matee
Inventor
John J. Walters.
By Pagelsen and Spencer,
Attorneys

UNITED STATES PATENT OFFICE.

JOHN J. WALTERS, OF BUFFALO, NEW YORK.

COOLER FOR LIQUIDS.

1,297,760.   Specification of Letters Patent.   Patented Mar. 18, 1919.

Application filed March 27, 1916. Serial No. 86,850.

*To all whom it may concern:*

Be it known that I, JOHN J. WALTERS, a citizen of the United States, and residing at Buffalo, in the county of Erie and State of New York, have invented a new and Improved Cooler for Liquids, of which the following is a specification.

This invention relates to means for cooling beverages such as beer and other carbonated liquids that are served from large containers under pressure, and its object is to provide a cheap and efficient cooling device wherein the beverage will be in contact with a minimum amount of metal, the beverage being held in a container of glass, procelain or other vitreous material for a considerable length of time, and the container being so formed as to have a comparatively large area in contact with ice water by which it is surrounded.

This invention consists of a container formed by outer and inner members between which the beverage is held, and a bottom connecting said members, all integral with each other and of a material not affected by fruit acids, of a pipe extending up the interior of the inner member to discharge the liquid to be cooled into the interior of the container, and a pipe connected into the bottom of the container to convey away the cooled liquid.

It further consists in the details of construction illustrated in the accompanying drawing and particularly pointed out in the claims.

In the drawing, Figure 1 is a general view of this improved cooling device connected to a barrel of liquid under pressure. Fig. 2 is a central vertical section of the improved cooling device. Fig. 3 is a perspective of a nut. Fig. 4 is a plan of the discharge valve body. Fig. 5 is a bottom plan of the cooler on a smaller scale.

Similar reference characters refer to like parts throughout the several views.

Ginger ale, beer, mineral waters and other carbonated liquids are usually served directly from barrels, casks and other containers, under pressure. Where the pressure derived from the carbonic-acid-gas in the liquid is not sufficient, air pumps are usually employed to create an artificial pressure, so that, for the present purpose, it may be assumed that the liquid in the original cask or other container is under pressure. It will be understood, however, that this cooler will operate equally well when the source of supply is at a sufficient height to create a sufficient pressure by gravity. It will also be understood that it will operate effectually to reduce the temperature of liquids that are not carbonated.

This cooler is preferably of glazed earthenware or stoneware, although glass, porcelain, enameled steel or cast iron, or any other material not affected by fruit acids or other ingredients of the beverages may be employed. The outer shell 1 connects to a bottom 2, from which the inner member 3, preferably of frusto-conical shape, extends upwardly. This inner member is of less height than the outer, and its shape is selected in order that the space between the two members shall taper downwardly.

A circular cover plate 4, preferably formed with a flange 5, rests on the gasket 6 and when pressed down, forms an air-tight joint with the upper edge of the shell. A cross-shaped plate 7 rests on the top of this cover while a similar plate 8 extends below the bottom 2. Legs 9 having feet 10 screw into this lower cross 8 while the plates 7 and 8 are connected by means of the bolts 11 and wing nuts 12.

Referring now to Fig. 1, it will be seen that the cooler is within a tub or tank 14, containing a liquid having a low temperature, preferably ice water, which will fill the space within the part 3 and around the part 1. The cask 15 has a pipe 16 extending down to near its bottom and a valve 17 to control the flow of liquid from the cask. This valve receives a nipple 18 that connects to the tee 19, and a pipe 20 extends from this tee to the cooler. A plug 21 is screwed into the tee 19 for a purpose to be hereinafter described.

The upper end of this inner member 3 is formed with an opening to receive the bushing 23 having a flange 24 at is lower end and a nut 25 screwed onto its upper end. The nut is provided with a cross bar 26 having a threaded hole 27 into which extends the lower threaded end of the stem 28 which supports the deflector 29. The upper end of the pipe 20 extends up into the bushing 23 and is there secured in any desired manner, preferably by soldering. This deflector causes the liquid from the pipe 20 to flow laterally toward the shell 1 and prevents the liquid from disturbing the float valve.

A bushing 31 extends through a hole in the bottom 2 and has a flange 32 at its upper end and a nut 33 on its lower end. A discharge pipe 34 extends into this bushing and connects at its opposite end to any desired faucet or valve 35.

In order to notify the attendant that the contents of the cask 15 are exhausted, a float valve and signal are mounted on the cover 4. A fitting 36 screws into the cover and a whistle 37 is mounted on the fitting. The lower end of the fitting is pointed and its bore may be closed by means of a disk 38 of rubber carried by the float-lever 39. A float 40 on the rod 41 carried by the end of the lever 39 usually floats in the liquid contents of the cooler, and presses the disk 38 against the lower end of the fitting. But when the level of the liquid falls, the passage in the fitting is opened, and the air or gas under pressure in the cooler rushes out and sounds the alarm. The lever is mounted on the pin 43 carried by a collar 44 which is secured to the fitting 36 in any desired manner. I prefer a set-screw 45, as this permits vertical adjustment of the collar and lever.

In order to drain the cooler back into the container 15, the following mechanism is provided. A bushing 48 having a valve seat 49 is secured in position in the bottom by means of a nut 50. This bushing is threaded to receive the threaded body 52 of a plug-valve. Grooves 53 may be cut in the wall of the bushing above the valve seat to permit the liquid to flow to the pipe 54 that connects to the pipe 20 that extends to the cask 15. A valve stem 55 connects to the plug-valve 52 and a wheel 56 may be removably connected to its upper end. A stuffing box 57 of any desired construction mounted in the cover 4 prevents leakage around the stem 55.

When the cooler is to be cleaned, the valve 17 is closed and the plug 21 removed. The cover 4 is taken off and the valve 52 taken out. Any water used to clean the cooler will flow down the pipe 20 and out through the opening in the tee 19 usually closed by the plug 21.

It will be understood that proper gaskets will be used to make tight joints around the bushings 23, 31 and 48. The pipes are preferably of block tin, the bushings, the nut 25, the deflector 29 and the valve 52 are preferably of silver or silver plated, and thus all parts are little liable to be affected by the liquids that are being cooled.

I claim:—

1. In a cooler for liquids, the combination of two hollow members of vitreous material, one within the other, the inner member being frusto-conical of less height than the outer and having a closed upper end provided with an inlet opening, a bottom joining the lower ends of the two members and having an outlet opening, said members and bottom being integral, a feed pipe connecting into the upper end of the inner member at the inlet opening, a discharge pipe connecting to said bottom at the outlet opening, a cover for the outer member, an alarm mounted on said cover and operable by the gases within the cooler, and means within the outer member to control the alarm.

2. In a cooler for liquids, the combination of two hollow members of vitreous material, one within the other, the inner member being of less height than the outer and having a closed upper end provided with an inlet opening, a bottom joining the lower ends of the two members and having an outlet opening, said members and bottom being integral, a feed pipe connecting into the upper end of the inner member at the inlet opening, a discharge pipe connecting to said bottom at the outlet opening independently of the feed pipe, a second discharge pipe connecting to said bottom and to said feed pipe, a valve to control the flow of liquid from said second discharge pipe, and a cover for the outer member.

3. In a cooler for liquids under pressure, the combination of a body of vitreous material consisting of concentric inner and outer members and a bottom connecting their lower ends, the inner member having a closed upper end and being of less height than the outer, said members being so formed that the space between them decreases downwardly, a feed pipe passing up within the inner member and connecting into the top thereof, a discharge pipe connecting into said bottom, a cover for said outer member, a whistle mounted on said cover and operable by the gases within the cooler, and a float valve mounted on said cover to control said whistle, the float of said valve causing the valve to open when the liquid in the cooler falls below a predetermined level.

JOHN J. WALTERS.